United States Patent [19]

Erickson

[11] Patent Number: 5,046,982
[45] Date of Patent: * Sep. 10, 1991

[54] CONSTRUCTION APPARATUS

[75] Inventor: Harry Erickson, Vancouver, Canada

[73] Assignee: Arlington-Hews, Inc., Vancouver, Canada

[ * ] Notice: The portion of the term of this patent subsequent to Mar. 27, 2007 has been disclaimed.

[21] Appl. No.: 424,103

[22] Filed: Oct. 20, 1989

Related U.S. Application Data

[63] Continuation of Ser. No. 212,142, Jun. 13, 1988, Pat. No. 4,911,672, which is a continuation of Ser. No. 841,207, Mar. 19, 1986, abandoned, which is a continuation of Ser. No. 723,542, Apr. 15, 1985, abandoned.

[51] Int. Cl.$^5$ ............................................. A63H 33/00
[52] U.S. Cl. .................................................... 446/112
[58] Field of Search ...................... 403/389, 396, 397; 446/112, 107, 108, 126, 128, 111

[56] References Cited

U.S. PATENT DOCUMENTS

| | | |
|---|---|---|
| D. 295,649 | 5/1988 | Takahashi . |
| 1,495,267 | 5/1924 | Snell . |
| 1,958,508 | 5/1934 | Audet . |
| 2,057,942 | 10/1936 | Fay . |
| 2,776,521 | 1/1957 | Zimmerman . |
| 2,791,868 | 5/1957 | Viken . |
| 2,888,072 | 5/1959 | Nicholas . |
| 2,894,056 | 7/1959 | Bogese . |
| 3,000,134 | 9/1961 | Marini . |
| 3,120,078 | 2/1964 | Bessinger . |
| 3,271,895 | 9/1966 | Sorensen . |
| 3,412,519 | 11/1968 | Brettingen . |
| 3,579,858 | 8/1971 | Ogsbury . |
| 3,654,726 | 4/1972 | Witte . |
| 3,663,347 | 5/1972 | Schoen . |
| 3,757,430 | 9/1973 | MacBride . |
| 3,802,133 | 4/1974 | Gregory . |
| 3,827,177 | 8/1974 | Wengel . |
| 3,830,011 | 8/1974 | Ochrymowich . |
| 3,998,003 | 12/1976 | Rosenbaum . |
| 4,044,497 | 8/1977 | Bettews . |
| 4,219,958 | 9/1980 | Shulyak . |
| 4,253,268 | 3/1981 | Mayr . |
| 4,352,255 | 10/1982 | Warehime . |
| 4,536,995 | 8/1985 | Frederick . |
| 4,911,672 | 3/1990 | Erickson ............................ 446/112 |

FOREIGN PATENT DOCUMENTS

| | | |
|---|---|---|
| 163390 | 7/1952 | Australia . |
| 849775 | 8/1970 | Canada . |
| 969365 | 6/1975 | Canada . |
| 59507 | 3/1988 | Canada . |
| 0198652 | 4/1986 | European Pat. Off. . |
| 617011 | 7/1935 | Fed. Rep. of Germany . |
| 2636990 | 2/1978 | Fed. Rep. of Germany . |
| 1524233 | 3/1967 | France . |
| 2239085 | 7/1973 | France . |
| 2534484 | 4/1984 | France . |
| 918877 | 12/1960 | United Kingdom . |
| 1238975 | 7/1971 | United Kingdom . |

Primary Examiner—Joseph Falk
Attorney, Agent, or Firm—Bull, Housser & Tupper

[57] ABSTRACT

A construction apparatus has a plurality of relatively flat components (8,50,56,88,90) having at least three sides, an elongated rod-like member (25,52) extending along each side and enlarged corner portions (26,54) between the members. A plurality of connectors (6) is provided for connecting together adjacent sides of adjacent members to form structures. Each connector has a pair of recesses (62,64) shaped to releasably embrace adjacent pairs of members (25,52). The recesses of each connector open outwardly in a common direction so connectors may be positioned on pairs of members without altering previously formed portions of the structure.

10 Claims, 8 Drawing Sheets

CONSTRUCTION APPARATUS

This is a continuation of U.S. patent application Ser. No. 07/212,142 filed June 13, 1988 now U.S. Pat. No. 4,911,672, which is a continuation of application Ser. No. 06/841,207 filed Mar. 19, 1986, now abandoned, which was a continuation of application Ser. No. 06/723,542 filed Apr. 15, 1985, now abandoned.

BACKGROUND OF THE INVENTION

This invention relates to a construction apparatus useful as a toy, amusement device, or for making models of the type having a plurality of components which can be connected together by connectors.

A number of construction apparatuses have been developed in the past which include a plurality of plane figures, typically having three, four or five sides, and connectors for connecting the plane figures together to form three dimensional shapes. Examples are disclosed in U.S. Pat. Nos. 3,120,078 to Bessinger; 2,776,521 to Zimmerman; 3,597,858 to Ogsbury and 3,000,134 to Marini as well as British patent number 918,877 to Zander and German patent number 617,011 to Fay.

In Zimmerman and Zander the plane figures are formed by perimeter members surrounding a substantially open central area. Zander discloses separate plates which are fitted to the perimeter members to fill the central area.

Each panel in Ogsbury is provided with beaded joint portions along each side edge thereof. The beaded joint portions are substantially in the shape of rods extending along the sides. Ogsbury employs elongated connectors which have sockets for receiving the beaded joint portions. Some of these connectors are substantially W-shaped in section. One advantage of using such connectors is that they permit adjacent panels to be aligned at different angles according to the particular three dimensional shape being made. This is shown in FIG. 9 of Ogsbury. However, the shapes of connectors disclosed by Ogsbury present difficulties in construction. Such connectors cannot be fitted between an existing structure and a new panel in some situations without disturbing the existing structure. In such situations Ogsbury does not allow the new panel to be placed in its final position and then place the various connectors where required between the new panel and existing structure.

SUMMARY OF THE INVENTION

The invention provides a construction apparatus having a plurality of relatively flat components with at least three sides. An elongated rod-like member extends along each side and enlarged corner portions are between the members. There is a plurality of connectors for connecting together adjacent sides of adjacent members to form structures. Each connector has a pair of recesses shaped to releasably embrace adjacent pairs of the members. The recesses of each connector open outwardly in a common direction so connectors may be positioned on pairs of members without altering previously formed portions of the structure.

DESCRIPTION OF THE PREFERRED EMBODIMENTS

Figure 3:
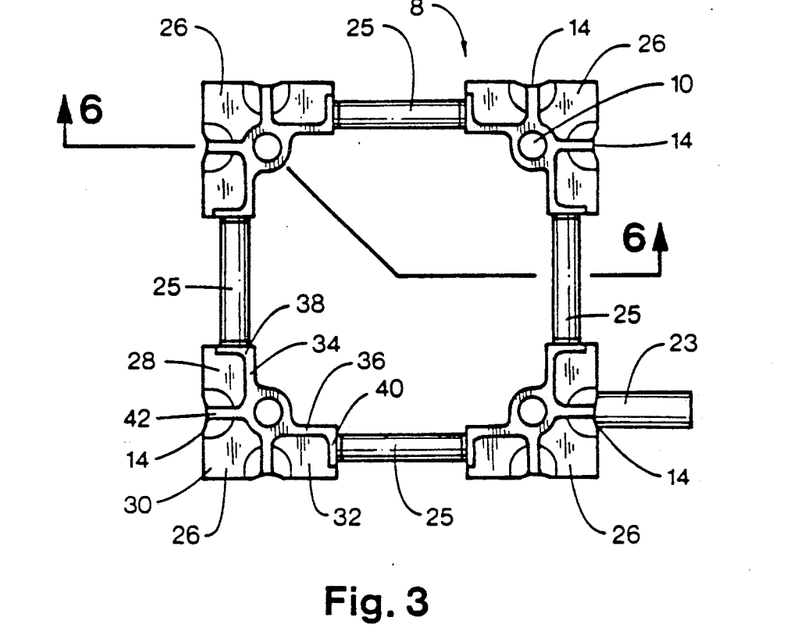
FIG. 3 is a top plan equivalent to FIG. 1 showing a four-sided component.
Figure 4:
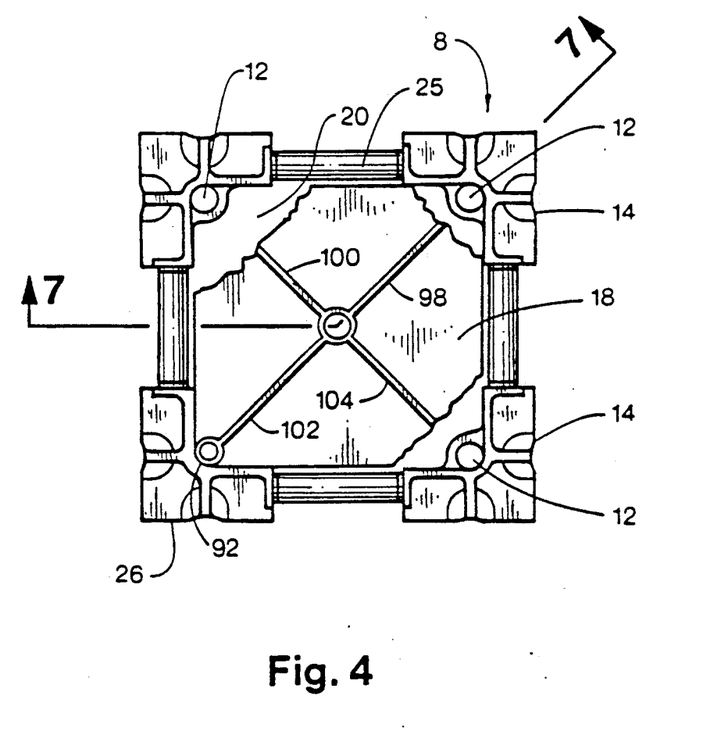
FIG. 4 is a bottom plan thereof shown fitted with a four-sided plate-like member, the plate-like member being partly broken away.
Figure 5:
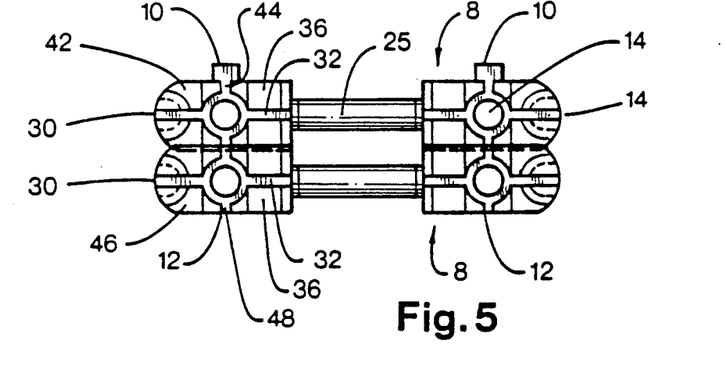
FIG. 5 is a side elevation of the component shown in FIG. 3 fitted to a similar said component.
Figure 6:
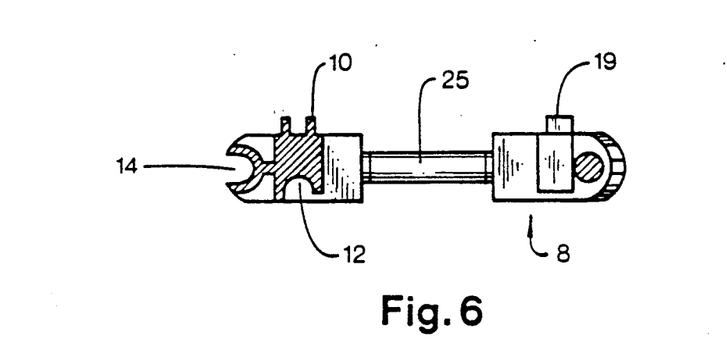
FIG. 6 is a sectional view taken along line 6—6 of FIG. 3.
Figure 7:
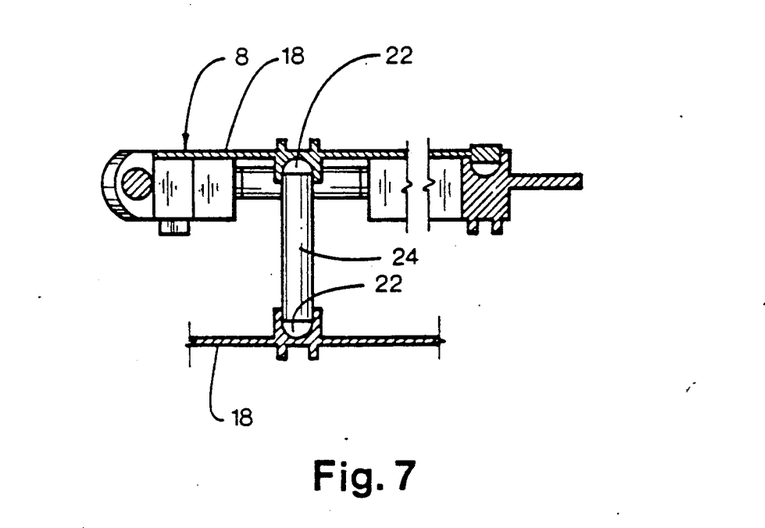
FIG. 7 is a partly broken away sectional view taken along line 7—7 of FIG. 4 and showing the plate-like member connected by a rod to a similar plate-like member.
Figures 15, 16, 17:
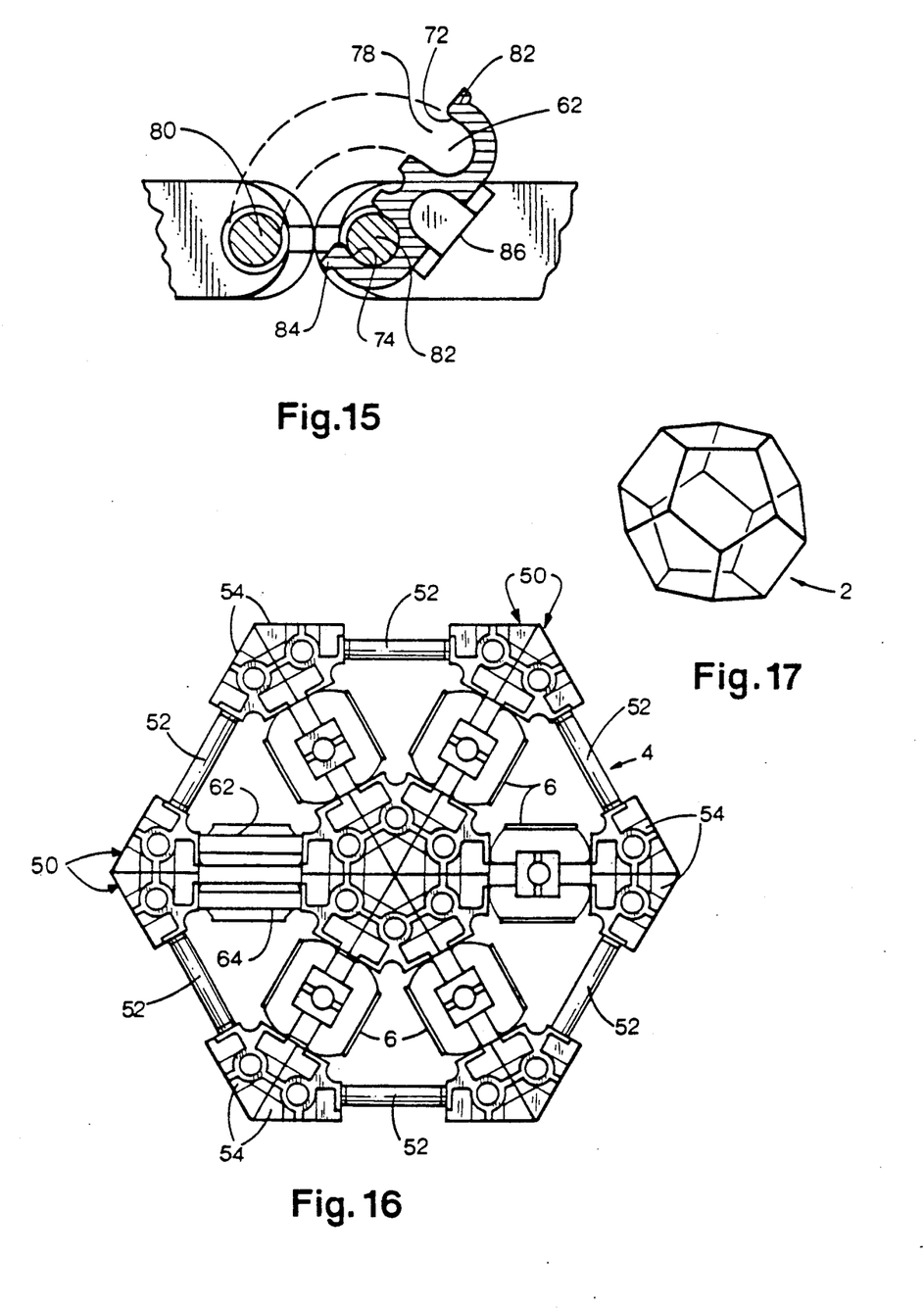
FIG. 15 is a similar sectional view showing how the connector is swung into position to connect together the flat components without moving the positions of the flat components.
FIG. 16 shows a plurality of three-sided flat components connected together with the connectors to form a hexagonal figure.
FIG. 17 shows a three dimensional dodecahedron formed with twelve five-sided flat components as shown in FIG. 8 when connected together by the connectors of FIG. 9.
Figure 18:
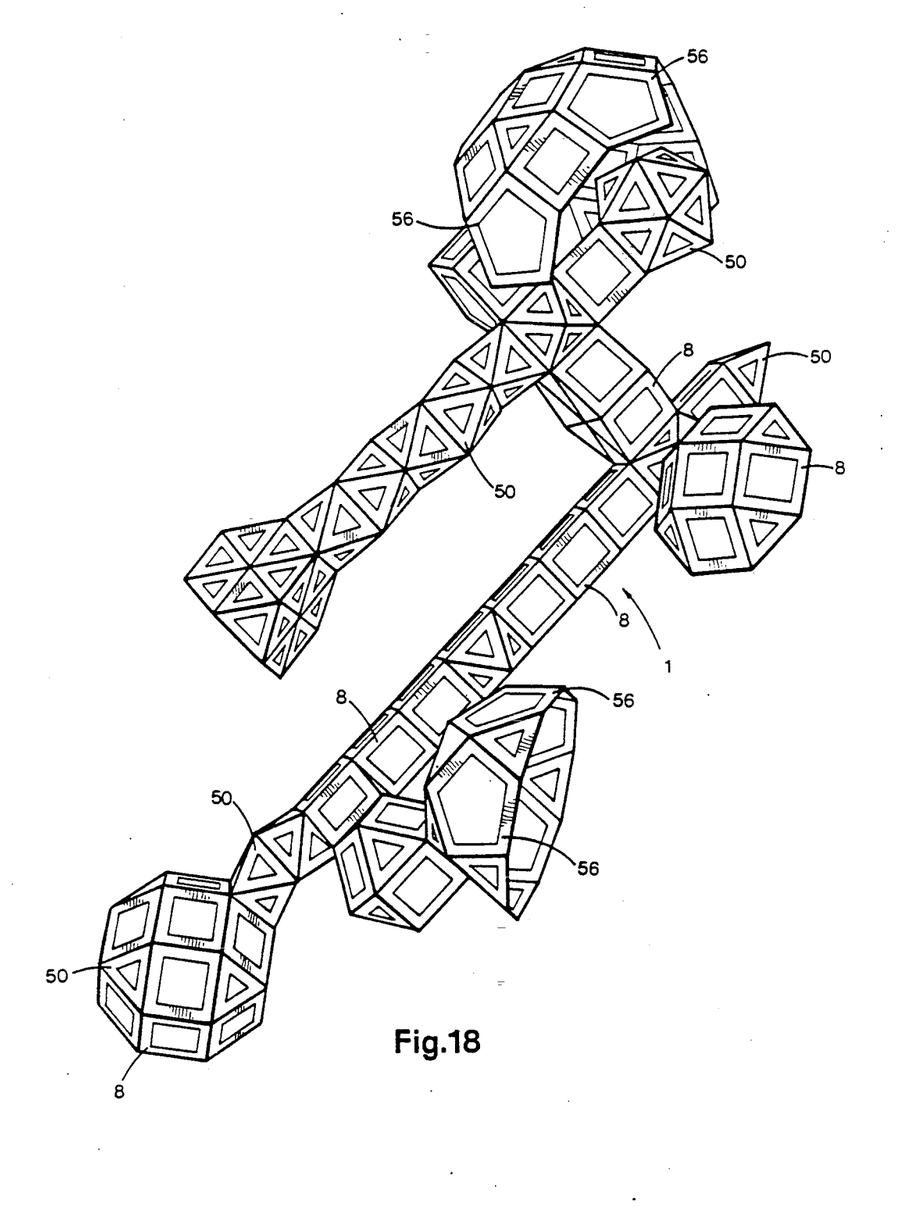
FIG. 18 is a simplified perspective view of a model space station formed with a plurality of the flat components, connectors, plate-like members and rods.

A toy or model, such as the space station 1 of FIG. 18 is constructed by connecting together a plurality of three-dimensional structures such as the dodecahedron 2 of FIG. 17. In turn, this structure is made by connecting together a plurality of flat components having at least three sides as shown in FIGS. 1-8. Alternatively, these flat components can be connected together to form a larger planar shape such as hexagon 4 of FIG. 16 formed by connecting together six of the triangular components shown in FIGS. 1 and 2. The flat components of FIGS. 1-8 are connected together by connectors 6 shown in FIGS. 9, 10 and 11. Larger planar structures such as the hexagon of FIG. 16 or three-dimensional structures such as the dodecahedron 2 of FIG. 17 are connected together to form more elaborate structures such as the model of FIG. 18 by at least three different methods. Firstly, each of the flat components, such as four-sided component 8 of FIGS. 3 and 4, is fitted with a protrusion 10 near each corner on the top side thereof and a complementary socket 12 on the bottom thereof near each corner. The sockets and protrusions extend perpendicularly to the plane defined by the flat component and are capable of connecting similar flat components together as illustrated in FIG. 5. Alternatively, each flat component has a plurality of sockets 14 arranged around the edge thereof, two adjacent each corner. These sockets are capable of receiving one end of a rod 23 as shown in FIG. 3, the other end of which may be fitted to another flat component to connect them together. A third method employs plate-like members, such as four-sided plate-like member 18 shown partly broken away in FIG. 4. Member 18 spans the square centre opening 20 of component 8 and has a central socket 22 capable of receiving a rod, such as rod 24 of FIG. 7, the other end of which is capable of being fitted into an equivalent socket in another plate-like member fitted to a flat component of any shape provided.

Referring to the flat components in more detail, it may be seen in FIGS. 3 and 4 that the four-sided flat component 8 has an elongated rod 25 extending along each side thereof to form a perimeter frame with four corner portions 26. The rods are cylindrical in shape and are, in this embodiment, integral with the corner portions. The corner portions 26 have three flat flanges 28, 30 and 32, as shown in the lower left hand corner portion 26 of FIG. 3, which are co-planar with the flat component. Flanges 30 and 32 are seen on edge in the side elevation of FIG. 5 which shows two components 8 connected together. The flat flanges are strengthened by webs 34 and 36 which extend outwardly from each corner along the inside of each of the corner portions towards the rods 24. Perpendicular webs 38 and 40 extend from webs 34 and 36 adjacent the rods. There are also strengthening webs 42 and 44 extending perpendicularly towards the sides of the flat components at each corner on the top of sockets 14 and equivalent webs 46 and 48 on the bottom of the sockets. The corner portions including the perpendicular webs, such as webs 42 and 46, have curved outer edges as seen for example in FIG. 5. This allows adjacent flat components to be in contact while connected at different angular positions as described below and shown in FIGS. 12–14. As described previously, there is a protrusion 10, generally in the shape of a cylindrical tube, on the top of each corner portion and a complementary socket 12 directly below it on the bottom of each corner portion. These are adapted to be interfitted as shown in FIG. 5. The remaining corner portions of the four-sided component of FIGS. 3 and 4 are identical to the one described.

Figure 1:
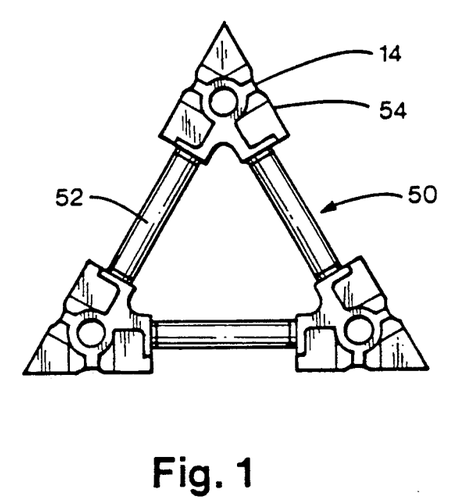
FIG. 1 is a top plan of a three-sided flat construction component according to an embodiment of the invention.
Figure 2:
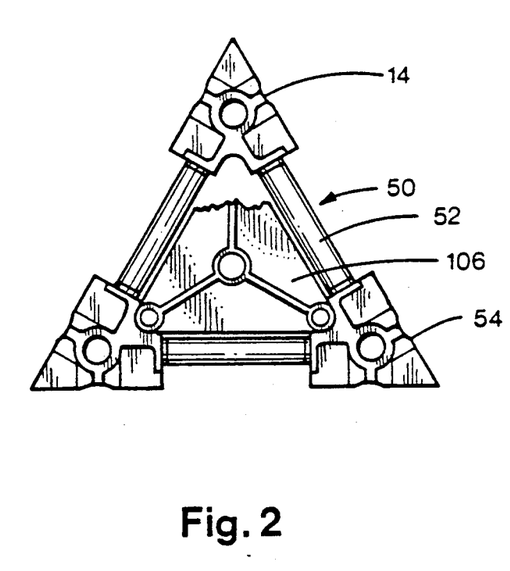
FIG. 2 is a bottom plan thereof showing the component fitted with a plate-like member spanning the open centre portion thereof, the plate-like member being partly broken away.
Figure 8:
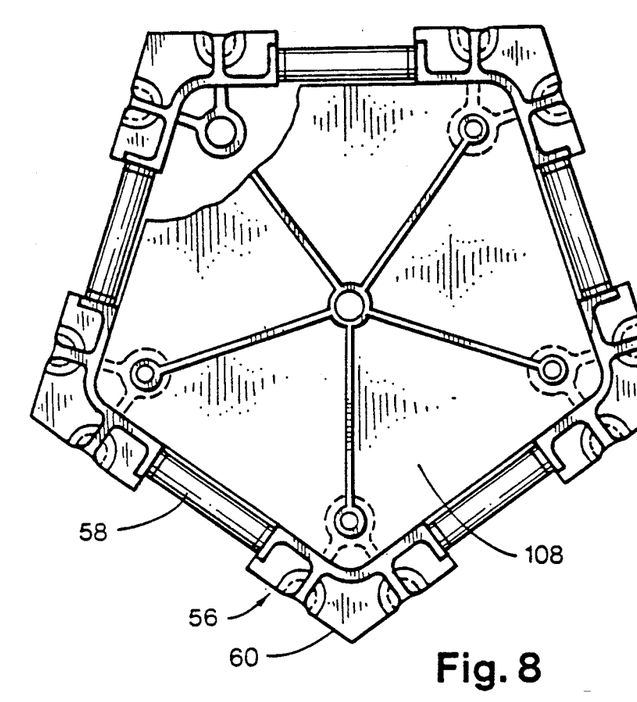
FIG. 8 is a top plan of a five-sided flat component fitted with a five-sided plate-like member which is partly broken away.

FIGS. 1 and 2 show a three-sided or triangular flat component 50 provided with three rods 52 and three corner portions 54. The rods and corner portions are similar to those of the four-sided component with necessary adjustments to the shape, particularly of the corner portions as may be seen. Likewise, the five-sided component 56 of FIG. 8 is similar, having five rods 58 and five corner portions 60.

Figure 9:
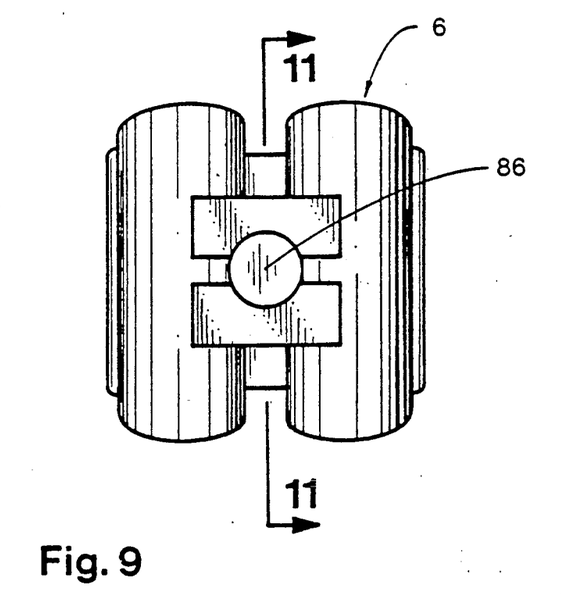
FIG. 9 is a top plan of a connector for connecting together the components of FIGS. 1-8.
Figure 10:
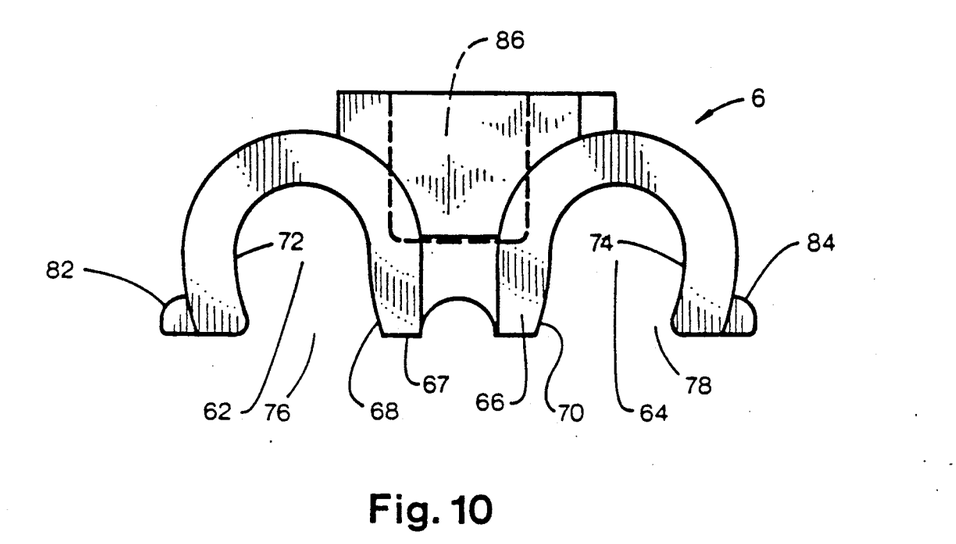
FIG. 10 is an end elevation thereof.
Figure 11:
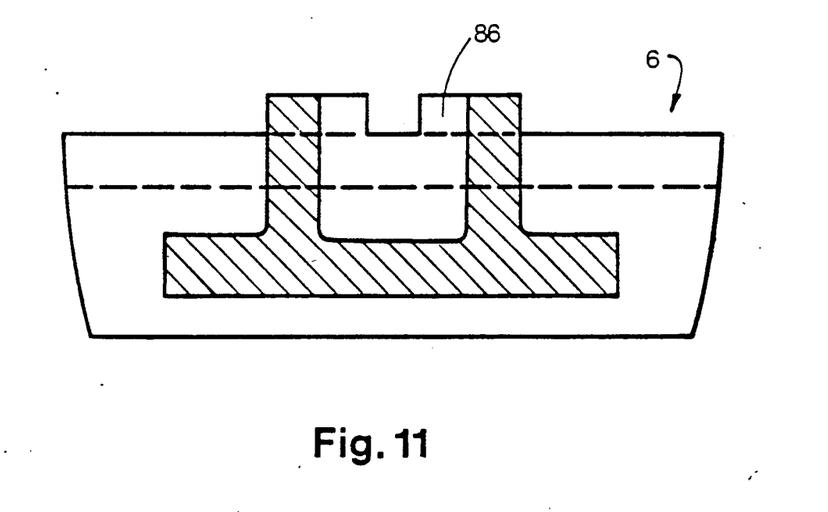
FIG. 11 is a sectional view taken along line 11—11 of FIG. 9.

FIGS. 9–11 illustrate connector 6 used to connect the flat components together. As shown best in FIG. 10, each connector has a pair of recesses 62 and 64 which are substantially U-shaped to releasably embrace adjacent pairs of rods of adjacent flat components, such as the rods 25 of four-sided flat components 8 of FIGS. 3 and 4. It may be observed that the recesses face outwardly in the same direction, namely downwards from the point of view and in the orientation of FIG. 10. The recesses are elongated as may be observed in the left connector 6 shown inverted in FIG. 16.

Figure 12:
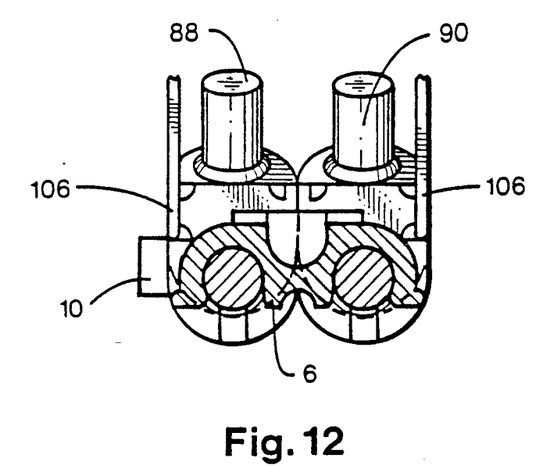
FIGS. 12-14 are fragmentary sectional views showing the connector of FIG. 9 connecting together flat components of FIGS. 1-8 at three different angular positions.
Figure 13:
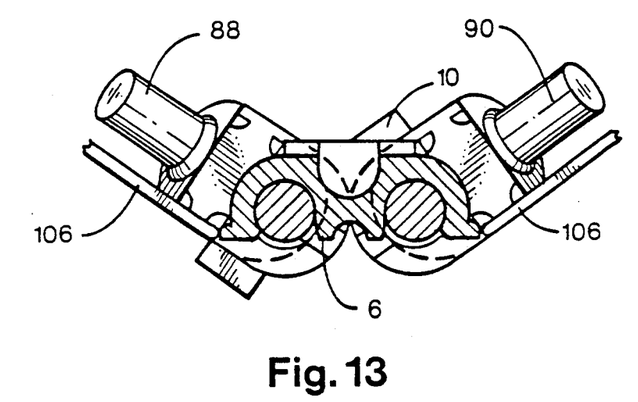
Figure 14:
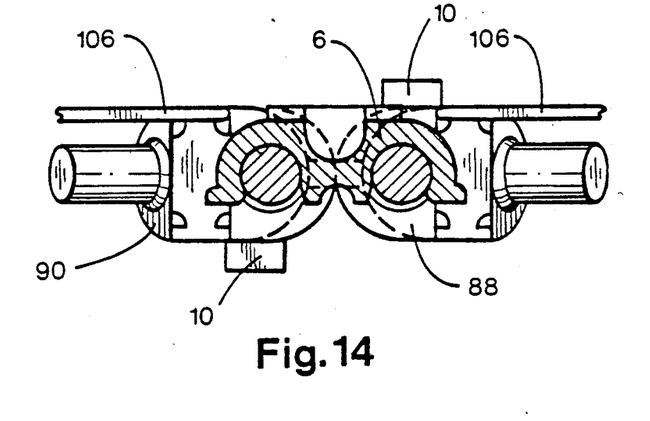

The recesses 62 and 64 of each connector are separated by a central portion 66 having an outer end 67 defined by inner sides 68 and 70 of the recesses which, as may be seen in FIG. 10, are angled towards each other so the central portion tapers towards its outer end 67. At the same time, the recesses have concavely curved outer walls or sides 72 and 74 respectively to form narrowed outer openings 76 and 78 for each recess. Thus the recesses are capable of receiving the rods of the flat members with a snapping action. At the same time, because the central portion is tapered it can be fitted between adjacent rods without displacing them or the flat components of which they are a part. This is shown best in FIG. 15. It may be seen readily that connector 6 can be rotated counter-clockwise from the illustrated position to connect together rods 80 and 82 without moving the rods at all when the edges of the flat components touch. The central portion 66 is tapered and so does not displace the rods 80 and 82 as it is rotated between the rods, rather the snapping action is accomplished by outward deformation of the concave outer walls or sides 72 and 74 of connector 6. The connectors have outwardly directed lateral lips 82 and 84 extending along opposite sides, these lips provide grips for pushing the connectors into position or removing them to disassemble a structure. Each component also has a socket 86 on the top thereof as illustrated in FIG. 9. This provided another means for connecting together a structure employing rods, such as rod 24 in FIG. 7. Opposite ends of the rods can be fitted within the sockets 86 of two different connectors or may connect the connectors to plate-like members, for example using socket 22 shown in FIG. 7, or to the flat components, for example using sockets 14 shown in FIG. 4. The connectors may be used to connect together flat components at various angular positions relative to each other. FIGS. 12 to 14 illustrate this for fragments of two flat components 88 and 90. In FIG. 12, the flat components are adjacent and parallel, in FIG. 13 they form an obtuse angle with each other and FIG. 14 the components are co-planar. This last type of connection is used in FIG. 16 where six of the connectors 6 are used to connect together six three-sided components 50 to form a hexagon.

As stated, each of the flat components is substantially a perimeter frame having an open centre portion, such as the centre opening 20 for the four-sided component shown in FIG. 4. To fill the open centre portion and give a structure a solid appearance, a plurality of plate-like members is provided. FIG. 4 illustrated the four-sided plate-like member which is shaped to releasably fit within centre opening 20 and span it. The plate-like member is the same shape as the centre opening and has, in this case, four rounded corner portions 92, only one of which is shown in FIG. 4. These corner portions are shaped to fit over sockets 12. Each plate-like member has a central socket, such a socket 22 shown in FIG. 7, for receiving a rod 24 as shown. Four strengthening webs 98, 100, 102 and 104 radiate outwards from the socket towards each corner. These strengthen the plate-like member to provide rigidity.

Three-sided plate-like members 106 and five-sided plate-like members 108 are also provided as shown in FIGS. 2 and 8. These are similar in construction to the member 18 shown in FIG. 4 apart from the number of sides and thus are not described in detail.

I claim:

1. A connector for connecting first and second spaced parallel cylindrical rods of construction toys or models, the connector comprising:

a central portion having an outer end and first and second tapered sides tapering towards said outer end; and first and second curved outer walls extending outwardly from opposite sides of said central portion, said first and second curved outer walls being curved inwards towards said first and second tapered sides respectively to from first and second U-shaped recesses between said first and second curved outer walls respectively and said central portion, said first and second U-shaped recesses each including an opening having a predetermined width adjacent said outer end of said central portion, said first and second tapered sides extending a distance less than said predetermined width of said respective openings, said first and second recesses having partially circular inner portions to receive the respective first and second cylindrical rods therein, and said recesses having outer portions with said outer walls being concavely curved sufficiently to form a narrowed opening between respective said outer walls and respective said tapered sides to releasably retain the respective rods in the respective recess, the first tapered side of the central portion being inclined sufficiently to provide clearance to receive the first rod therein with negligible deflection of the rod as the connector rotates about the second rod which journals the connector in the inner portion of the second recess, the narrowed portion of the first recess having a dimension slightly less than the diameter of the inner portion of the first recess so that the first outer wall deflects as the first rod enters the first recess, and vice versa.

2. A connector as claimed in claim 1 wherein said outer walls have respective outwardly directed lateral lips.

3. A connector as claimed in claim 1 wherein the central portion has an inner end portion disposed oppositely to the outer end portion and projecting outwardly from the first and second curved outer walls, the inner end portion having a socket therein.

4. A connector as claimed in claim 1, in which the first tapered side of the central portion is generally parallel to a generally oppositely disposed portion of the first curved outer wall of the narrowed opening between the first outer wall and the first tapered side, and the second tapered side of the central portion is generally parallel to a generally oppositely disposed portion of the second curved outer wall of the narrowed opening between the second outer wall and the second tapered side.

5. A connector comprising:
(a) a central portion having an outer end and first and second tapered sides tapering towards said outer end,
(b) first and second curved outer walls extending outwardly from opposite sides of said central portion, said outer walls being curved inwardly towards said first and second tapered sides respectively to form first and second U-shaped recesses on opposite sides of said central portion, the recesses being disposed between respective curved outer walls and said central portion, said first and second U-shaped recesses each including an opening having a predetermined width adjacent said outer end of said central portion, said first and second tapered sides extending a distance less than said predetermined width of said respective openings, each recess having a partially circular inner portion and an outer portion having a narrowed opening between a respective outer wall and an opposed tapered side, the narrowed portion having a dimension slightly less than the diameter of the respective inner portion of the recess, the first tapered side of the central portion being generally parallel to a generally oppositely disposed portion of the first curved outer wall of the narrowed opening between the first outer wall and the first tapered side, and the second tapered side of the central portion being generally parallel to a generally oppositely disposed portion of the second curved outer wall of the narrowed opening between the second outer wall and the second tapered side.

6. A connector as claimed in claim 5, wherein said outer walls have respective outwardly directed lateral lips.

7. A connector as claimed in claim 1, wherein the central portion has an inner end portion disposed oppositely to the outer end thereof and projecting outwardly from the first and second curved outer walls, the inner end portion having a socket therein.

8. A connector comprising:
(a) a central portion having an outer end and first and second tapered sides tapering towards said outer end,
(b) first and second curved outer walls extending outwardly from opposite sides of said central portion, said outer walls being curved inwardly towards said first and second tapered sides respectively to form first and second U-shaped recesses on opposite sides of said central portion, the recesses being disposed between respective curved outer walls and said central portion, said first and second U-shaped recesses each including an opening having a predetermined width adjacent said outer end of said central portion, said first and second tapered sides extending a distance less than said predetermined width of said respective openings, each recess having a partially circular inner portion and an outer portion having a narrowed opening between a respective outer wall and an opposed tapered side, the narrowed portion having a dimension slightly less than the diameter of the respective inner portion of the recess.

9. A connector as claimed in claim 8, wherein said outer walls have respective outwardly directed lateral lips.

10. A connector as claimed in claim 8, wherein the central portion has an inner end portion disposed oppositely to the outer end thereof and projecting outwardly from the first and second curved outer walls, the inner end portion having a socket therein.

* * * * *